(12) United States Patent
Lehman et al.

(10) Patent No.: US 10,699,195 B2
(45) Date of Patent: Jun. 30, 2020

(54) TRAINING OF ARTIFICIAL NEURAL NETWORKS USING SAFE MUTATIONS BASED ON OUTPUT GRADIENTS

(71) Applicant: Uber Technologies, Inc., San Francisco, CA (US)

(72) Inventors: Joel Anthony Lehman, San Francisco, CA (US); Kenneth Owen Stanley, San Francisco, CA (US); Jeffrey Michael Clune, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 16/220,541

(22) Filed: Dec. 14, 2018

(65) Prior Publication Data

US 2019/0188573 A1 Jun. 20, 2019

Related U.S. Application Data

(60) Provisional application No. 62/599,577, filed on Dec. 15, 2017.

(51) Int. Cl.
*G06N 3/08* (2006.01)
*G06K 9/62* (2006.01)
*G06N 3/04* (2006.01)

(52) U.S. Cl.
CPC ........... *G06N 3/086* (2013.01); *G06K 9/6288* (2013.01); *G06N 3/0445* (2013.01)

(58) Field of Classification Search
None
See application file for complete search history.

(56) References Cited

U.S. PATENT DOCUMENTS

| | | | |
|---|---|---|---|
| 5,727,081 A * | 3/1998 | Burges | G06K 9/342 382/161 |
| 7,483,774 B2 | 1/2009 | Grichnik et al. | |
| 9,619,748 B1 | 4/2017 | Commons et al. | |
| 9,715,870 B2 | 7/2017 | Hwang et al. | |
| 2007/0258648 A1 * | 11/2007 | Perronnin | G06K 9/726 382/224 |
| 2009/0265134 A1 * | 10/2009 | Sambasivan | G05B 23/0297 702/179 |

(Continued)

OTHER PUBLICATIONS

Srinivas et al. (Adaptive Probabilities of Crossover and Mutation in Genetic Algorithms, Apr. 1994, pp. 656-667) (Year: 1994).*

(Continued)

*Primary Examiner* — George Giroux
(74) *Attorney, Agent, or Firm* — Fenwick & West LLP (57) ABSTRACT

Systems and methods are disclosed herein for ensuring a safe mutation of a neural network. A processor determines a threshold value representing a limit on an amount of divergence of response for the neural network. The processor identifies a set of weights for the neural network, the set of weights beginning as an initial set of weights. The processor trains the neural network by repeating steps including determining a safe mutation representing a perturbation that results in a response of the neural network that is within the threshold divergence, and modifying the set of weights of the neural network in accordance with the safe mutation.

8 Claims, 9 Drawing Sheets

(56) References Cited

U.S. PATENT DOCUMENTS

| | | | |
|---|---|---|---|
| 2012/0140636 A1* | 6/2012 | Resende | H04L 45/08 370/238 |
| 2014/0108307 A1* | 4/2014 | Raghunathan | G06N 20/00 706/12 |
| 2015/0106311 A1 | 4/2015 | Birdwell et al. | |
| 2015/0178799 A1* | 6/2015 | Cheng | G06Q 30/0283 705/413 |
| 2015/0363356 A1* | 12/2015 | Rasmusson | G06F 9/3832 712/10 |
| 2016/0034814 A1* | 2/2016 | Audhkhasi | G06N 3/08 706/12 |
| 2016/0260012 A1 | 9/2016 | Hunzinger et al. | |

OTHER PUBLICATIONS

Chiou et al. (Variable Scaling Hybrid Differential Evolution for Solving Network Reconfiguration of Distribution Systems, May 2005, pp. 668-674) (Year: 2005).*
Tang et al. (Adaptive Directed Mutation for Real-coded Genetic Algorithms, Aug. 2012, pp. 600-614) (Year: 2012).*
Pizzuti (GA-Net: A Genetic Algorithm for Community Detection in Social Networks, 2008, pp. 1081-1090) (Year: 2008).*
Lafond et al. (Diagonal Rescaling for Neural Networks, May 2017, pp. 1-12) (Year: 2017).*
Hochreiter et al. (Gradient Flow in Recurrent Nets: the Difficulty of Learning Long-Term Dependencies, 2001, pp. 1-15) (Year: 2001).*
Bedau, M. et al., "Open Problems in Artificial Life," Artificial Life, vol. 6, No. 4, Oct. 2000, pp. 363-376.
Clune, J. et al., "On the performance of indirect encoding across the continuum of regularity," IEEE Transactions on Evolutionary Computation, vol. 15, Iss. 3, Jun. 2011, pp. 346-367.
Fernando, C. et al., "Pathnet: Evolution channels gradient descent in super neural networks," arXiv preprint arXiv:1701.08734, Jan. 30, 2017, pp. 1-16.
Floreano, D. et al., "Neuroevolution: From Architectures to Learning," Evolutionary Intelligence, vol. 1, Mar. 2008, pp. 47-62.
Gangwani, T. et al., "Genetic Policy Optimization," arXiv:1711.01012v1, Nov. 3, 2017, pp. 1-13.
Gauci, J. et al., "Autonomous Evolution of Topographic Regularities in Artificial Neural Networks," Neural Computation, vol. 22, No. 7, Jul. 2010, pp. 1860-1898.
Glorot, X. et al., "Deep Sparse Rectifier Neural Networks," International Conference on Artificial Intelligence and Statistics, Apr. 2011, pp. 315-323.
Glorot, X. et al., "Understanding the difficulty of training deep feedforward neural networks," Proceedings of the Thirteenth International Conference on Artificial Intelligence and Statistics, May 2010, pp. 249-256.
Hansen, N. et al., "Reducing the Time Complexity of the Derandomized Evolution Strategy with Covariance Matrix Adaptation (CMA-ES)," Evolutionary computation, vol. 11, No. 1, Feb. 2003, pp. 1-18.
Hausknecht, M. et al., "A Neuroevolution Approach to General Atari Game Playing," IEEE Transactions on Computational Intelligence and AI in Games, vol. 6, No. 4, Dec. 16, 2003, pp. 355-366.
Hausknecht, M. et al., Deep Recurrent Q-Learning for Partially Observable MDPs, AAAI 2015 Fall Symposium, Nov. 2015, pp. 29-37.
Hochreiter, S. et al., "Long shortterm memory," Neural computation, 9(8), 1997, pp. 1735-1780.
Ioffe, S. et al., "Batch normalization: Accelerating deep network training by reducing internal covariate shift," International Conference on Machine Learning, Jul. 2015, pp. 448-456.
Kingma, D. et al., "Adam: A method for stochastic optimization," International Conference on Learning Representations, May 2015, pp. 1-15.
Klambauer, G. et al., "Self-normalizing neural networks," 31st Conference on Neural Informational Processing Systems, Dec. 2017, pp. 1-102.
Lecun, Y. et al., "Deep Learning," Nature, vol. 521, May 28, 2015, pp. 436-444.
Lehman, J. et al., "Abandoning objectives: Evolution through the search for novelty alone," Evolutionary Computation, vol. 19, No. 2, May 2011, pp. 189-223.
Lehman, J. et al., "ES Is More Than Just a Traditional Finite-Difference Approximator," GECCO '18, Jul. 2018, pp. 1-9.
Lehman, J. et al., "Evolvability is Inevitable: Increasing Evolvability Without the Pressure to Adapt," PLoS ONE, vol. 8, Iss. 4, e62186, Apr. 24, 2013, pp. 1-9.
Lehman, J. et al., "Improving Evolvability Through Novelty Search and Self-Adaptation," Proceedings of the 2011 IEEE Congress on Evolutionary Computation (CEC 2011), Jun. 2011, pp. 2693-2700.
Lehman, J. et al., "Neuroevolution," Scholarpedia, 8(6):30977, pp. 1-8.
Liu, H. et al., "Hierarchical Representations for Efficient Architecture Search," arXiv preprint arXiv:1711.00436, Feb. 22, 2018, pp. 1-13.
Meyer-Nieberg, S. et al., "Self-Adaptation in Evolutionary Algorithms," Parameter Setting in Evolutionary Algorithms, Mar. 2007, pp. 47-75.
Miikkulainen, R. et al., "Evolving deep neural networks," arXiv preprint arXiv:1703.00548v2, Mar. 4, 2017, pp. 1-8.
Mirowski, P. et al., "Learning to Navigate in Complex Environments," arXiv preprint arXiv:1611.03673, Jan. 13, 2017, pp. 1-16.
Mouret, J. et al., "Illuminating search spaces by mapping elites," arXiv preprint arXiv:1504.04909, Apr. 21, 2015, pp. 1-15.
Pascanu, R. et al., "On the Difficulty of Training Recurrent Neural Networks," Proceedings of the 30th International Conference on Machine Learning, Jun. 2013, pp. 1310-1318.
Pathak, D. et al., Curiosity-Driven Exploration by Self-Supervised Prediction. ICML 2017, Aug. 2017, pp. 16-17.
PCT International Search Report and Written Opinion, PCT Application No. PCT/162018/060144, dated Apr. 26, 2019, nine pages.
Pelikan, M. et al., "A Survey of Optimization by Building and Using Probabilistic Models," Computational Optimization and Applications, vol. 21, Iss. 1, Jan. 2002, pp. 5-20.
Popovici, E. et al., "Coevolutionary Principles," Handbook of Natural Computing, Jul. 2012, pp. 987-1033.
Pugh, J. et al., "Quality diversity: A new frontier for evolutionary computation," Frontiers in Robotics and AI, vol. 3, Article 40, Jul. 2016, pp. 1-17.
Riedmiller, M. et al., "A Direct Adaptive Method for Faster Backpropagation Learning: The RPROP Aalgorithm," IEEE International Conference on Neural Networks, Mar.-Apr. 1993, p. 586-591.
Risi, S. et al., "Enhancing ES-HyperNEAT to Evolve More Complex Regular Neural Networks," Proceedings of the 13th Annual Conference on Genetic and Evolutionary Computation, Jul. 2011, pp. 1539-1546.
Salimans, T. et al., "Evolution strategies as a scalable alternative to reinforcement learning," arXiv preprint arXiv:1703.03864, Sep. 7, 2017, pp. 1-13.
Schulman, J. et al., "Trust region policy optimization," Proceedings of the 32nd International Conference on Machine Learning, Jul. 2015, pp. 1889-1897.
Stanley, K. et al., "A hypercube-based indirect encoding for evolving large-scale neural networks," Artificial Life, vol. 15, No. 2, Mar. 2009, pp. 185-212.
Stanley, K. et al., "A Taxonomy for Artificial Embryogeny," Artificial Life, vol. 9, No. 2, Spring 2003, pp. 93-130.
Stanley, K., "Compositional pattern producing networks: A novel abstraction of development," Genetic Programming and Evolvable Machines Special Issue on Developmental Systems, 8(2), Jun. 2007, pp. 131-162.
Stanley, K. et al., "Evolving Neural Networks through Augmenting Topologies," Evolutionary Computation, vol. 10, No. 2, Summer 2002, pp. 99-127.
Tasfi, N., "PyGame-Learning-Environment," 2016, four pages, [Online] [Retrieved on May 15, 2019] Retrieved from the Internet <URL: https://github.com/ntasfi/PyGame-Learning-Environment>.

(56) References Cited

OTHER PUBLICATIONS

Wierstra, D. et al., "Natural evolution strategies," 2008 IEEE Congress on Evolutionary Computation (IEEE World Congress on Computational Intelligence), Jun. 2008, pp. 3381-3387.
Wilke, C. et al., "Evolution of Digital Organisms at High Mutation Rates Leads to Survival of the Flattest," Nature, vol. 412, Jul. 19, 2001 pp. 331-333.
Yao, X., "Evolving Artificial Neural Networks," Proceedings of the IEEE, vol. 87, No. 9, Sep. 1999, pp. 1423-1447.
Zagoruyko, S. et al., "Wide Residual Networks," arXiv preprint arXiv:1605.07146, Nov. 28, 2016, pp. 1-15.
Nolfi, S. et al., "Evolutionary Robotics," MIT Press, Cambridge, 2000, TJ211.37. N65.

\* cited by examiner

TRAINING OF ARTIFICIAL NEURAL NETWORKS USING SAFE MUTATIONS BASED ON OUTPUT GRADIENTS

CROSS-REFERENCE TO RELATED APPLICATIONS

The instant application claims the benefit of U.S. Provisional Patent Application No. 62/599,577, filed Dec. 15, 2017, the disclosure of which is hereby incorporated by reference herein in its entirety.

BACKGROUND

1. Technical Field

The subject matter described generally relates to artificial neural networks, and in particular to training artificial neural networks using safe mutations based on output gradients.

2. Background Information

Artificial neural networks (or neural networks) are used for performing complex tasks, for example, natural language processing, computer vision, speech recognition, bioinformatics, recognizing patterns in images, and so on. A neural network is represented as a set of nodes connected via edges associated with weights. Certain techniques for training a neural network modify weights of a neural network to obtain a modified neural network and evaluate the modified neural network. Neural networks may have several thousand or even millions of weights. Therefore conventional techniques that modify the weights are likely to break existing functionality. For example, previous modifications to the weights may result in some portions of the neural network to embody specific functionality. However, subsequent modifications to the weights of the neural networks may cause beneficial changes to certain portions of the neural network but break portions that were close to optimal. As a result, conventional techniques that modify weights of a neural network to determine the correct set of weights perform poorly.

SUMMARY

Systems and methods are disclosed herein for enabling safe modifications to the weights of a neural network by adjusting the perturbations based on the sensitivity of a parameter to be perturbed. This, in effect, allows smaller perturbations to be made when an error gradient with respect to a particular parameter is large, and also informs when larger steps can be taken because the error gradient is small. The sensitivity of each parameter is determined from a source(s) of information that are generally freely available, such as an archive of representative experiences and corresponding neural network responses. Additional factors may go into a sensitivity determination as well, such as knowledge about the neural network's structure, which may be used to estimate a local effect of weight perturbations on a neural network's outputs.

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

DETAILED DESCRIPTION

Neural networks are a powerful tool in a wide range of technological fields, from medical diagnosis to spam filtering, and self-driving cars to ocean modelling. However, neural networks regularly have between tens of thousands and hundreds of millions of parameters (i.e., weights). In real world applications, this can cause problems with respect to both memory and network bandwidth requirements. In cases where the neural network is transmitted over the network, for example, for training the neural network using a parallel or distributed architecture, the bandwidth consumed by transmitting the neural network can also become a significant limiting factor.

Example Systems

Figure 1:
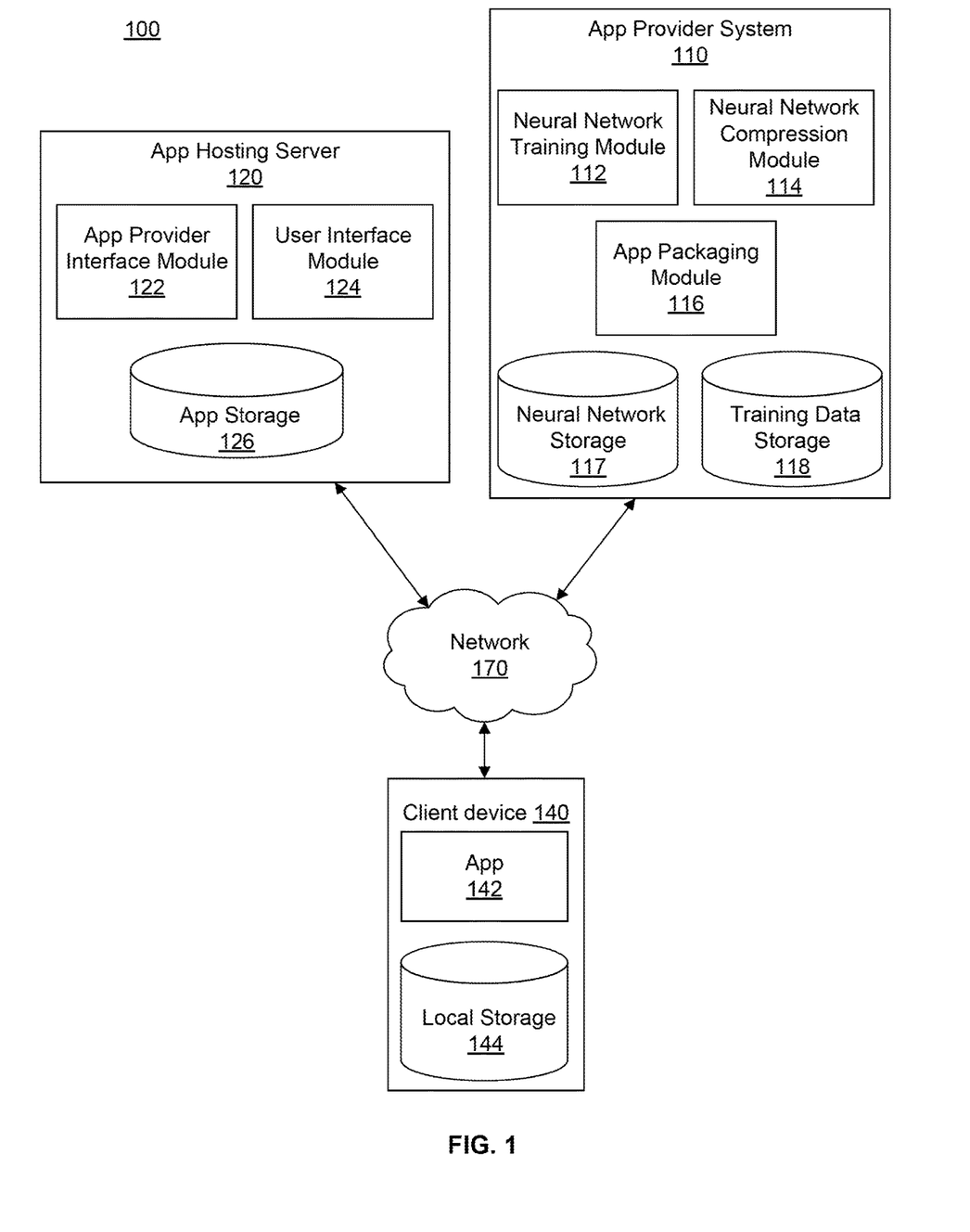
FIG. 1 is a high-level block diagram illustrating a networked computing environment in which neural networks may be used, according to one embodiment.

FIG. 1 illustrates one embodiment of a networked computing environment 100 in which neural network compression may be used. In the embodiment shown in FIG. 1, the networked computing environment 100 includes an application provider system 110, an application provider server 120, and a client device 140, all connected via a network 170. An application is also referred to herein as an app. Although only one client device 140 is shown, in practice many (e.g., thousands or even millions of) client devices may be connected to the network 170 at any given time. In other embodiments, the networked computing environment 100 contains different and/or additional elements. In addition, the functions may be distributed among the elements in a different manner than described. For example, the client device 140 may obtain the application 142 directly from the application provider system 110, rather than from the application hosting server 120.

The application provider system 110 is one or more computer systems with which the provider of software (e.g., an application designed to run on a cell phone or tablet) develops that software. Although the application provider system 110 is shown as a single entity, connected to the network 170, for convenience, in many cases it will be made up from several software developer's systems (e.g., terminals) which may or may not all be network-connected.

In the embodiment shown in FIG. 1, the application provider system 110 includes a neural network training module 112, a neural network compression module 114, an application packaging module 116, neural network storage 117, and training data storage 118. In other embodiments, the application provider system 110 contains different and/or additional elements. In addition, the functions may be distributed among the elements in a different manner than described.

The neural network training module 112 is used to train full neural networks. In one embodiment, the neural network training module 112 takes a set of training inputs that have known outputs (e.g., stored in the training data storage 118) and divides it into a training set and a validation set. The neural network is then trained using the training set (e.g., using a backpropagation algorithm) and then tested against the validation set to determine its accuracy after training. This process can be repeated using variations in the structure of the neural network and the results of validation compared to identify a neural network that is likely to reliably make the intended determination when presented with input data for which the correct output is already known.

For example, a neural network might be intended to identify faces in photographs. The training and validation sets would contain a variety of faces and instances of images including no face at all. The network is trained by adjusting parameters (e.g., node weightings) to minimize a loss function (i.e., a measure of the number and/or degree of errors) that results from applying the network to the training set. Once the neural network has been trained, it is applied to the validation set and the degree to which it successfully identifies faces is recorded. If the network makes few or no errors when applied to the validation set, this is a strong indicator that the network will correctly identify faces in photographs that have not already been classified.

The app packaging module 116 takes a lower-order representation of a neural network and packages it into an app to be provided to client devices 140. For example, the app packaging module 116 might be used to create an app for booking and managing trips with a ride-sharing service. In one embodiment, the app might include a neural network configured to take various data available at the client device 140 and predict whether the device is currently inside a vehicle providing a ride. The full neural network may be too large to provide to client devices 140 over the network 170, so in some examples, the app instead includes a lower-order representation of the full neural network that is sufficiently accurate to perform its operations or provide a good user experience. Once packaged, the app is made available to client devices 140 (e.g., via the app hosting server 120).

The neural network storage 117 and training data storage 118 include one or more computer-readable storage-media that are configured to store neural networks and training data, respectively. Although they are shown as separate entities in FIG. 1, this functionality may be provided by a single computer-readable storage-medium (e.g., a hard drive).

The app hosting server 120 is one or more computers configured to store apps and make them available to client devices 140. In the embodiment shown in FIG. 1, the app hosting server 120 includes an app provider interface module 122, a user interface module 124, and app storage 126. In other embodiments, the app hosting server 120 contains different and/or additional elements. In addition, the functions may be distributed among the elements in a different manner than described.

The app provider interface module 122 provides an interface with which app providers (e.g., the operator of app provider system 110) can add apps to a marketplace or other on-line store to make them available to users (either free or for payment of value). In one embodiment, an app provider fills out an on-line form with basic information about the app (e.g., name, app provider name, version number, a short description of what it does, and the like) and uploads the app in an appropriate format. The app provider interface module 114 adds the app (along with metadata with some or all of the information provided about the app) to app storage 126. In some cases, the app provider information module 114 also performs validation actions, such as checking that the app does not exceed a maximum allowable size, scanning the app for malicious code, verifying the identity of the provider, and the like.

The user interface module 124 provides an interface to client devices 140 with which apps can be obtained. In one embodiment, the user interface module 124 provides a user interface using which the users can search for apps meeting various criteria from a client device 140. Once users find an app they want (e.g., one provided by the app provider system 110), they can download them to their client device 140 via the network 170.

The app storage 126 include one or more computer-readable storage-media that are configured to store apps and associated metadata. Although it is shown as a single entity in FIG. 1, the app storage 126 may be made up from several storage devices distributed across multiple locations. For example, in one embodiment, app storage 126 is provided by a distributed database and file storage system, with download sites located such that most users will be located near (in network terms) at least one copy of popular apps.

The client devices 140 are computing devices suitable for running apps obtained from the app hosting server 120 (or directly from the app provider system 110). The client devices 140 can be desktop computers, laptop computers, smartphones, PDAs, tablets, or any other such device. In the embodiment shown in FIG. 1, the client device 140 includes an application 142 and local storage 144. The application 142 is one that uses a neural network to perform a task, such as one created by the application provider system 110. The local data store 144 is one or more computer readable storage-media and may be relatively small (in terms of the amount of data that can be stored). Thus, the use of a compressed neural network may be desirable, or even required.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
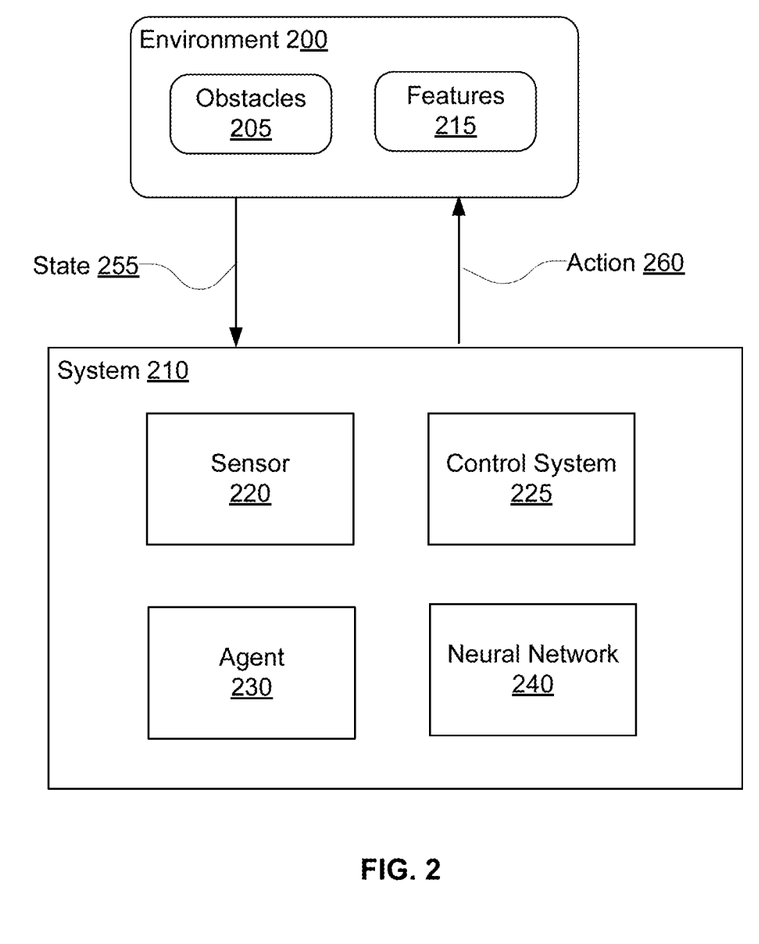
FIG. 2 illustrates a system environment comprising reinforcement learning based neural network, according to one embodiment.

FIG. 2 illustrates a system using reinforcement learning based neural network, according to one embodiment. The system 210 shown in FIG. 2 is a computing system that, depending on implementation, may be part of an apparatus or device, for example, a self-driving car or a robot. The environment 200 represents the surroundings of the system. For example, the environment 200 may represent a geographical region through which a self-driving car is travelling. Alternatively, the environment 200 may represent a maze or an obstacle course through which a robot is walking. As another example, the environment 200 may represent a setup of a game that the system 210 is playing, for example, an ATARI game.

The environment 210 may comprise obstacles 205 or features 215 that are detected by the system 210. The system 210 comprises one or more sensors (or input devices) 220, a control system 225, an agent 230, and a neural network 240. The system 210 uses the sensor 220 to sense the state 255 of the environment 200 and may perform certain actions 260. The actions 260 may cause the state of the environment to change. For example, the sensor 220 may be a camera that captures images of the environment. Other examples of sensors include a LIDAR, an infrared sensor, a motion sensor, a pressure sensor, or any other type of sensor that can provide information describing the environment 210 to the system 210. The agent 230 uses the neural network 240 to determine what action to take. The agent 230 sends signals to the control system 225 for taking the action 260. The neural network 240 is described in connection with FIG. 3.

For example, the sensors 220 of a robot may identify an object in the environment 200. The agent 230 of the robot invokes the neural network 240 to determine a particular action to take, for example, to move the object. The agent 230 of the robot sends signals to the control system 225 to move the arms of the robot to pick up the object and place it elsewhere. Similarly, a robot may use sensors to detect the obstacles surrounding the robot to be able to maneuver around the obstacles.

As another example, a self-driving car may capture images of the surroundings to determine a location of the self-driving car. As the self-driving car drives through the region, the location of the car changes and so do the surroundings of the car change. As another example, a system playing a game, for example, an ATARI game may use sensors to capture an image representing the current configuration of the game and make some move that causes the configuration of the game to change.

Figure 3:
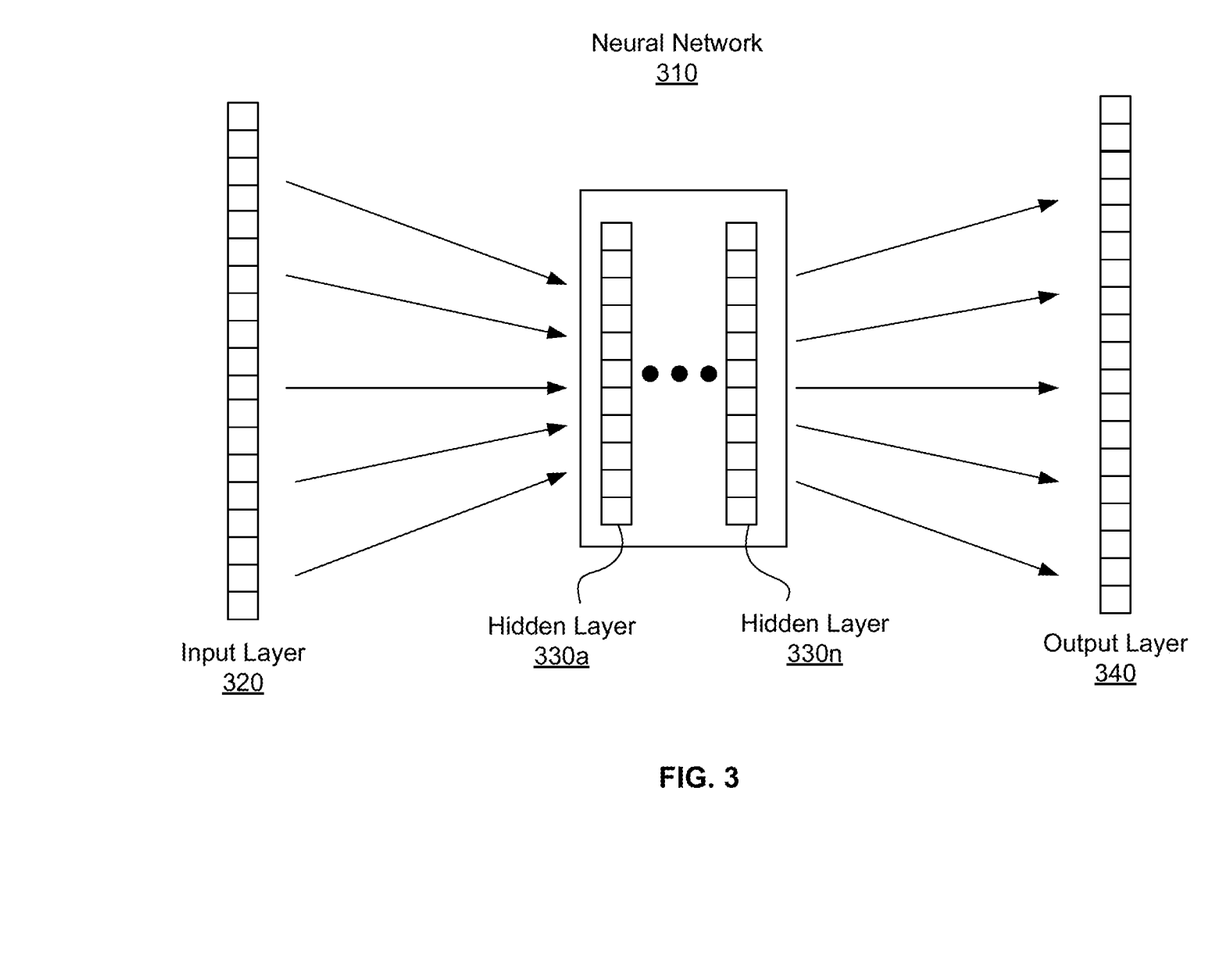
FIG. 3 is an example neural network, according to one embodiment.

FIG. 3 is an example neural network, according to one embodiment. The neural network 310 includes an input layer 320, one or more hidden layers 330a-n, and an output layer 340. In some examples, the neural network 310 of FIG. 3 can correspond to the neural network described in FIG. 1 or 2. Each layer of the neural network 310 (i.e., the input layer 320, the output layer 340, and the hidden layers 330a-n) comprises a set of nodes such that the set of nodes of the input layer 320 are input nodes of the neural network 310, the set of nodes of the output layer 340 are output nodes of the neural network 310, and the set of nodes of each of the hidden layers 330a-n are hidden nodes of the neural network 310.

Each node has one or more inputs and one or more outputs. Each of the one or more inputs to a node comprises a connection to an adjacent node in a previous layer and an output of a node comprises a connection to each of the one or more nodes in a next layer. The output of a node may be defined by an activation function that applies a set of weights to the inputs of the nodes of the neural network 310. In various embodiments, the output of a node is associated with a set of instructions corresponding to the computation performed by the node. Here, the set of instructions corresponding to the plurality of nodes of the neural network may be executed by one or more computer processors. The connections between nodes in the neural network 310 each is associated with a weight. In one or more embodiments, training the neural network 310 comprises adjusting values for weights of the neural network 310. The training of a neural network may be performed using a single processors based system or a parallel or distributed system that comprises a plurality of processors that interact with each other using interconnections between processors.

Distributed Architecture for Training Neural Network

Figure 4:
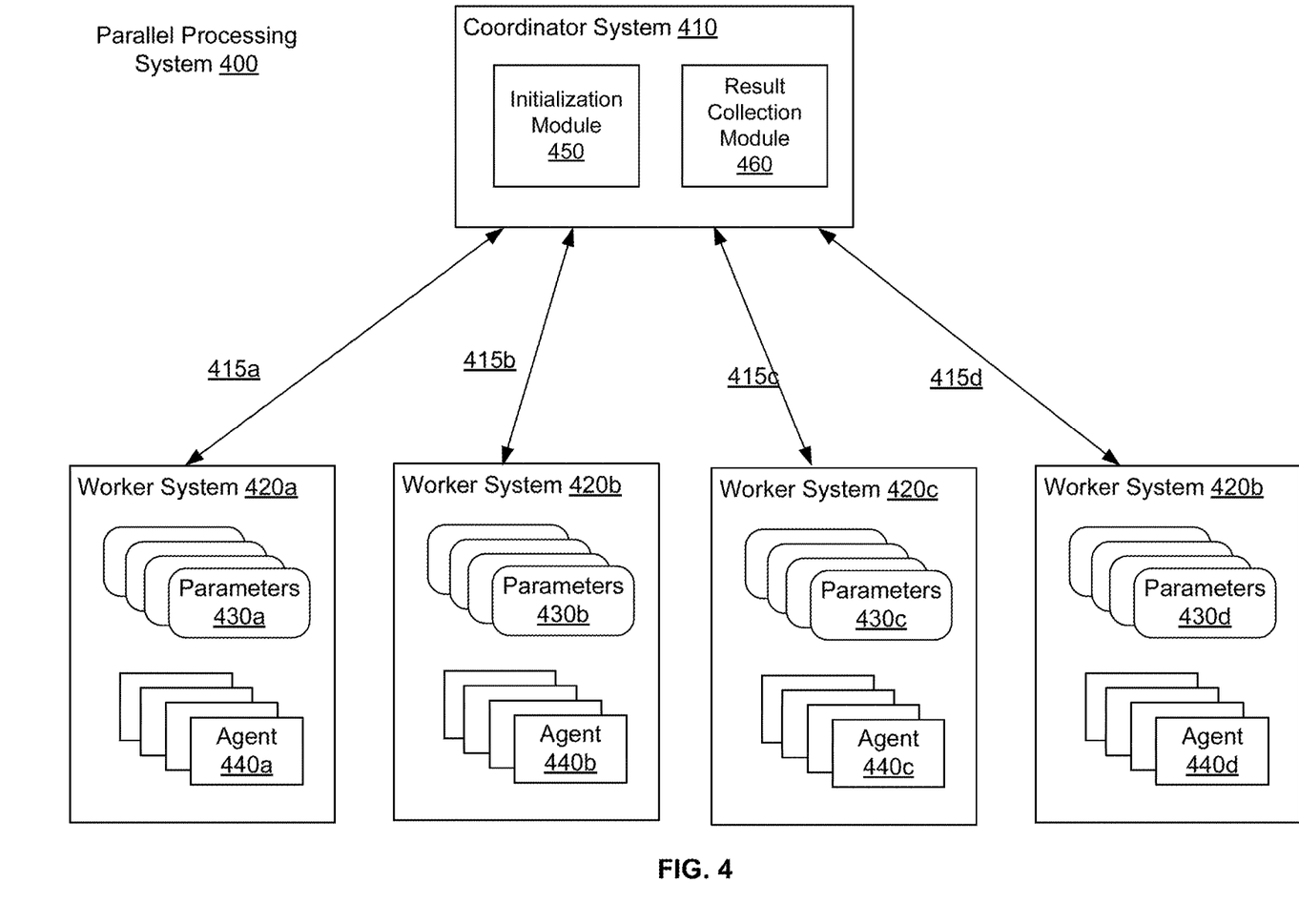
FIG. 4 is a parallel architecture for training a neural network, according to one embodiment.

FIG. 4 is an example parallel or distributed architecture for training a neural network, according to one embodiment. The parallel processing system 400 shown in FIG. 4 comprises a plurality of worker systems 420 and a coordinator system 410. The coordinator system 410 interacts 415 with the worker systems 420 to provide data, such as parameter vectors for processing and receives results based on processing performed by the worker systems 420.

The training of a neural network may be performed over a population of parameter vectors, each parameter vector representing a set of weights for a neural network. As shown in FIG. 4, each worker system 420 may process a subset of the population comprising one or more parameter vectors 430. Each worker system 420 includes one or more agents 440 that process corresponding parameter vectors. Components such as sensors and control systems are not shown in FIG. 4 but may be part of the worker systems or the coordinator system 410.

In one embodiment, the coordinator system 410 includes an initialization module 450 and a results collection module 460. Other embodiments may include more or different modules. The initialization module 450 initializes values that may be used by multiple worker systems. The results collection module 460 receives results from multiple worker systems, for example, for aggregating the results. For example, the coordinator system 410 may initialize a parameter vector and send it to one or more worker systems 420. Each worker system 420 performs perturbations of the parameter vector to determine new parameter vectors and evaluate them. The worker system 420 may send one or more new parameter vectors obtained by perturbing the initial parameter vector and send them as results to the coordinator system 410. In an embodiment, the coordinator system 410 and the worker systems 420 encode a parameter vector for sending to a target system that may be another worker system or coordinator system. The encoded representation of a parameter vector can be compressed and is efficient for transmitting over an interconnection network. The target system decodes the encoded parameter vector to obtain the parameter vector that was transmitted.

Figure 5:
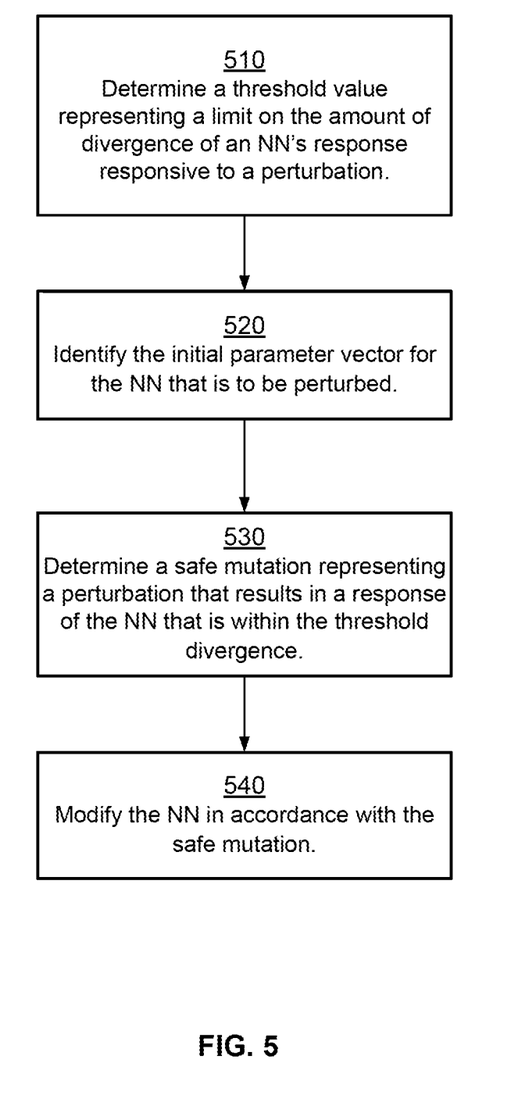
FIG. 5 is a process for performing safe mutations for training neural networks, according to one embodiment.

FIG. 5 is a process for performing safe mutations for training neural networks, according to one embodiment. According to some examples, the process described in FIG. 5 can be performed by a computing system using reinforcement learning based neural networks, such as the system 210 of FIG. 2. This process is referred to as the SM (safe mutations) process. A safe mutation is a mutation that is performed with respect to a sensitivity of a given parameter. If a parameter is highly sensitive, then a mutation is not safe unless the mutation taken is small, given that even a small mutation may cause a large change in the parameter if the parameter is highly sensitive. Similarly, if a parameter is not highly sensitive, then a large mutation may nonetheless be safe, as even a large mutation may cause only a small change in the parameter.

Following the elements of FIG. 5, the system 210 determines 510 a threshold value representing a limit on the amount of divergence of a neural network's response responsive to a perturbation. In some embodiments, the system 210 may determine the threshold value by accessing an archive of historical responses of the neural network (NN) to historical perturbations (e.g., from app storage 126, neural network storage 117, training data storage 118, and/or local storage 144). The system 210 may then determine, from the historical responses, a maximum amount that the neural network diverged (e.g., for a given parameter's perturbation) without causing an error, and may determine the threshold value based on the maximum amount. The system 210 may store the maximum amount to memory (e.g., neural network storage 117) so that future perturbations of the parameter in question can be taken without re-calculating the threshold.

The system 210 identifies 520 the initial set of weights for the neural network that is to be perturbed. For example, the system 210 retrieves the initial weights from neural network storage 117 or training data storage 118. The system 210 determines 530 a safe mutation representing a perturbation that results in a response of the neural network that is within the threshold divergence. In some embodiments (e.g., those corresponding to FIG. 6), the perturbation, without modification, would result in a perturbation that is not within the threshold divergence. In such embodiments, in connection with determining the safe mutation, the system 210 determines a rescaling for the perturbation that, if applied to the perturbation, would result in a response of the neural network that is within the threshold divergence. An example embodiment of determining the rescaling includes the system 210 decomposing the perturbation into a direction vector, the direction vector including a magnitude scalar and a direction. In one example, the system 210 may select the direction randomly. As an addition or an alternative, the system 210 may determine the magnitude scalar by using a line search to target an amount of divergence that is within the threshold divergence, and may assign that determined magnitude as the rescaling to be applied to the perturbation. The system 210 modifies 540 the neural network in accordance with the safe mutation, e.g., by applying the rescaling to the perturbation.

In some embodiments (e.g., those corresponding to FIG. 7), the system 210 determines 530 the safe mutation in a different manner. Specifically, the system 210 feeds the perturbation into a gradient model that models the output of a neural network (e.g., as a function of weight of a perturbation through a first-order Taylor expansion). The system 210 then determines a sensitivity of a parameter that is to be perturbed based on the output by generating a sensitivity vector comprising the sensitivities of each weight of the set of weights, and determining the sensitivity by selecting the sensitivity from the sensitivity vector based on the parameter. The system 210 modifies 540 the neural network in accordance with the safe mutation, e.g., by normalizing the perturbation based on the sensitivity.

Figure 6:
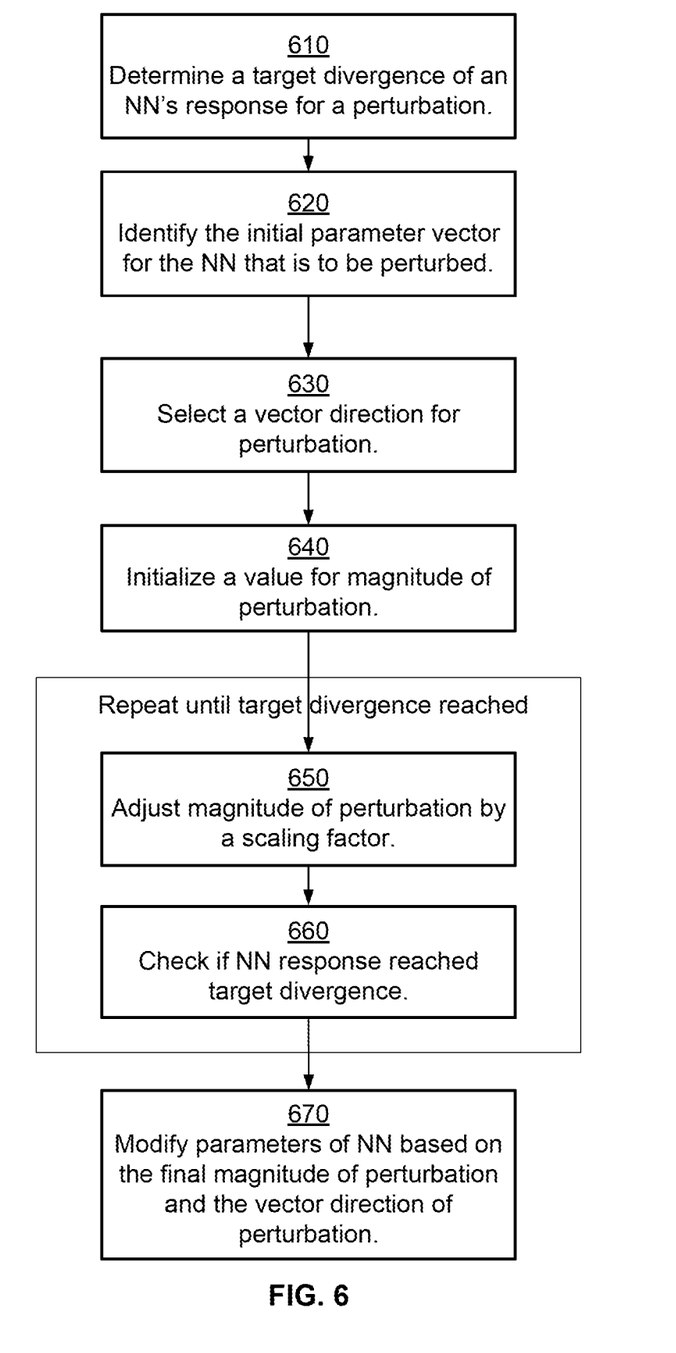
FIG. 6 is a process for performing safe mutations through rescaling for training neural networks, according to one embodiment.

FIG. 6 is a process for performing safe mutations through rescaling for training neural networks, according to one embodiment. According to some examples, the process described in FIG. 6 can be performed by a computing system using reinforcement learning based neural networks, such as the system 210 of FIG. 2. This process is referred to as the SM-R (safe mutations through rescaling) process. The system determines 610 a target divergence value of a neural network's response for a perturbation. The system identifies 620 the initial set of weights for the neural network that is to be perturbed. The system selects 630 a vector direction for perturbation and initializes 640 a value for magnitude of the perturbation. The system repeats the following steps 650 and 660 until the target divergence is reached. The system adjusts 650 the magnitude of perturbation by a scaling factor and checks 660 if the neural network response reached the target divergence responsive to increasing the magnitude by the scaling factor. For example, the system may adjust 650 the magnitude of perturbation by either increasing the value by the scaling factor or by decreasing the value by the scaling factor depending on whether the value is currently too low or too high relative to the desired amount of divergence. If the system determines that the target divergence is reached, the system modifies 670 the weights of the neural network based on the final magnitude of perturbation and the vector direction of perturbation.

Figure 7:
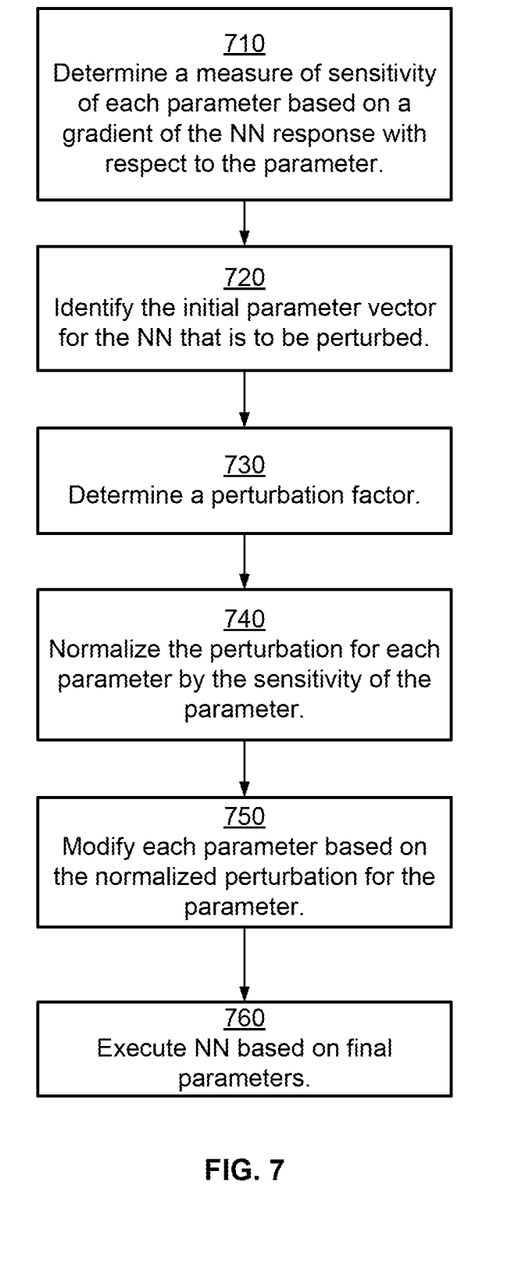
FIG. 7 is a process for performing safe mutations through gradients for training neural networks, according to one embodiment.

FIG. 7 is a process for performing safe mutations through gradients for training neural networks, according to one embodiment. In one example, the process described in FIG. 7 can be performed by a computing system using reinforcement learning based neural networks, such as the system 210 of FIG. 2. This process is referred to as the SM-G (safe mutations through gradients) process. The system determines 710 a measure of sensitivity of each weight based on a gradient of the neural network response with respect to the weight. The system identifies 720 the initial set of weights for the neural network that is to be perturbed. The system determines 730 a perturbation factor. The system normalizes 740 the perturbation for each weight by the sensitivity of the weight. The system modifies 750 each weight based on the normalized perturbation for the weight. The system executes 760 the neural network based on the final weights.

Figure 8:
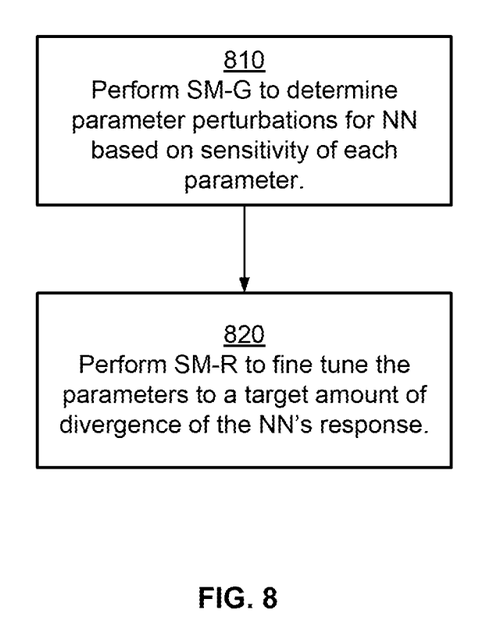
FIG. 8 is a process for performing safe mutations based on both rescaling and gradients for training neural networks, according to one embodiment.

FIG. 8 is a process for performing safe mutations based on both rescaling and gradients for training neural networks, according to one embodiment. According to some examples, the process described in FIG. 8 can be performed by a computing system using reinforcement learning based neural networks, such as the system 210 of FIG. 2. The system performs 810 safe mutations through gradients (SM-G) process to determine weight perturbations for neural network based on sensitivity of each weight. The system performs 820 the safe mutations through rescaling (SM-R) process to fine tune the weights to a target amount of divergence of the neural network's response.

Computing System Architecture

Figure 9:
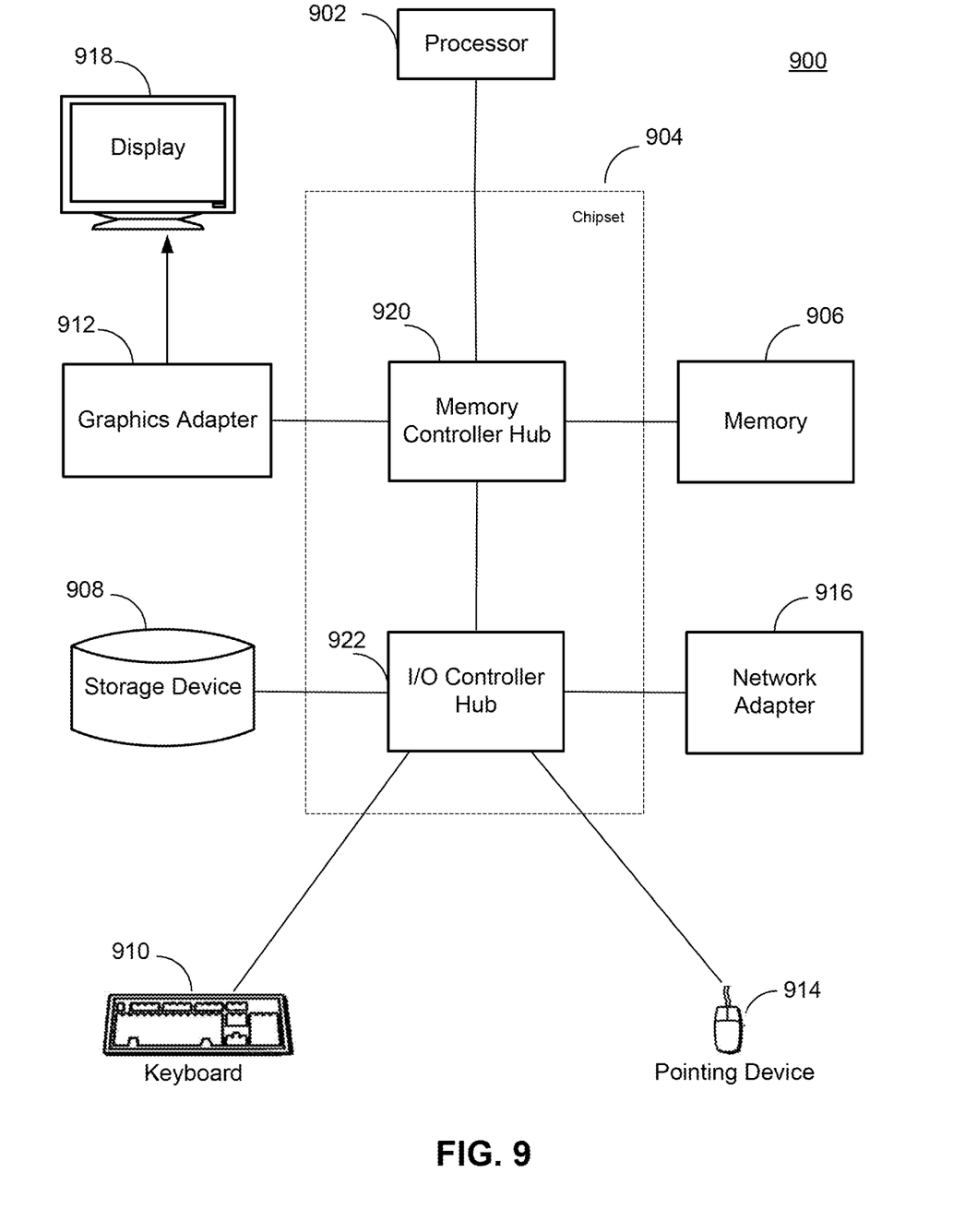
FIG. 9 is a high-level block diagram illustrating an example of a computer suitable for use in the system environment of FIG. 1-2, according to one embodiment.

FIG. 9 is a high-level block diagram illustrating an example computer 900 suitable for use as a client device 140, application hosting server 120, or application provider system 110. The example computer 900 includes at least one processor 902 coupled to a chipset 904. The chipset 904 includes a memory controller hub 920 and an input/output (I/O) controller hub 922. A memory 906 and a graphics adapter 912 are coupled to the memory controller hub 920, and a display 918 is coupled to the graphics adapter 912. A storage device 908, keyboard 910, pointing device 914, and network adapter 916 are coupled to the I/O controller hub 922. Other embodiments of the computer 900 have different architectures.

In the embodiment shown in FIG. 9, the storage device 908 is a non-transitory computer-readable storage medium such as a hard drive, compact disk read-only memory (CD-ROM), DVD, or a solid-state memory device. The memory 906 holds instructions and data used by the processor 902. The pointing device 914 is a mouse, track ball, touch-screen, or other type of pointing device, and is used in combination with the keyboard 910 (which may be an on-screen keyboard) to input data into the computer system 900. The graphics adapter 912 displays images and other information on the display 918. The network adapter 916 couples the computer system 900 to one or more computer networks (e.g., network 170).

The types of computers used by the entities of FIG. 1 can vary depending upon the embodiment and the processing power required by the entity. For example, the application hosting server 120 might include a distributed database system comprising multiple blade servers working together to provide the functionality described. Furthermore, the computers can lack some of the components described above, such as keyboards 910, graphics adapters 912, and displays 918.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for compressing neural networks. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

We claim:

1. A computer implemented method comprising:
   determining a threshold value representing a limit on an amount of divergence of response for a neural network;
   identifying a set of weights of the neural network, the set of weights corresponding to an initial set of weights; and
   training the neural network by:
      determining a safe mutation representing a perturbation that results in a response of the neural network that is within the threshold value, wherein the perturbation, without modification, would result in a perturbation that is not within the threshold value, and wherein determining the safe mutation comprises:
         feeding the perturbation into a gradient model;
         determining an output of the gradient model;
         determining a sensitivity of a parameter that is to be perturbed based on the output; and
         modifying the perturbation by normalizing the perturbation based on the sensitivity; and
      modifying the set of weights of the neural network in accordance with the safe mutation.

2. The computer implemented method of claim 1, wherein determining the threshold value comprises:
   accessing an archive of historical responses of the neural network to historical perturbations;
   determining, from the historical responses, a maximum amount that the neural network diverged without causing an error; and
   determining the threshold value based on the maximum amount.

3. The computer implemented method of claim 1, wherein the perturbation, without modification, would result in a perturbation that is not within the threshold value, wherein determining the safe mutation comprises determining a rescaling for the perturbation that, if applied to the perturbation, would result in a response of the neural network that is within the threshold value, and wherein modifying the set of weights of the neural networks in accordance with the safe mutation comprises applying the rescaling to the perturbation.

4. The computer implemented method of claim 3, wherein determining the rescaling comprises:
decomposing the perturbation into a direction vector comprising a magnitude scalar and a direction; and
determining the magnitude scalar by using a line search to target an amount of divergence that is within the threshold divergence; and
assigning the magnitude as the resealing.

5. The computer implemented method of claim 1, wherein determining the sensitivity comprises:
generating a sensitivity vector comprising the sensitivities of each weight of the set of weights; and
determining the sensitivity comprises selecting the sensitivity from the sensitivity vector based on the parameter.

6. The computer-implemented method of claim 1, further comprising:
receiving sensor data from one or more sensors, wherein the set of weights is derived from the sensor data; and
performing an action based on output of the neural network, wherein the output comprises the modified set of weights.

7. The computer-implemented method of claim 1, wherein generating the set of weights comprises:
transmitting each respective weight of the set of weights to a different respective worker system of a plurality of worker systems, wherein each respective worker system of the plurality of worker systems generates a respective modified weight of the set of weights.

8. The computer-implemented method of claim 1, wherein training the neural network comprises repeating the determining of the safe mutation, and the modifying of the set of weights.

* * * * *

UNITED STATES PATENT AND TRADEMARK OFFICE
CERTIFICATE OF CORRECTION

PATENT NO. : 10,699,195 B2  
APPLICATION NO. : 16/220541  
DATED : June 30, 2020  
INVENTOR(S) : Joel Anthony Lehman, Kenneth Owen Stanley and Jeffrey Michael Clune Page 1 of 1

It is certified that error appears in the above-identified patent and that said Letters Patent is hereby corrected as shown below:

On the Title Page

Page 2, Column 2, item (56), Other Publication, Line 34, delete "PCT/162018/060144," and insert --PCT/IB2018/060144,--

In the Claims

Column 11, Line 11, In Claim 4, delete "resealing." and insert --rescaling.--

Signed and Sealed this  
Seventeenth Day of November, 2020

Andrei Iancu  
*Director of the United States Patent and Trademark Office*